(12) United States Patent
Solomon

(10) Patent No.: US 8,446,364 B2
(45) Date of Patent: May 21, 2013

(54) VISUAL PAIRING IN AN INTERACTIVE DISPLAY SYSTEM

(75) Inventor: Yoram Solomon, Plano, TX (US)

(73) Assignee: Interphase Corporation, Plano, TX (US)

( * ) Notice: Subject to any disclaimer, the term of this patent is extended or adjusted under 35 U.S.C. 154(b) by 0 days.

(21) Appl. No.: 13/406,143

(22) Filed: Feb. 27, 2012

(65) Prior Publication Data

US 2012/0223883 A1 Sep. 6, 2012

Related U.S. Application Data

(60) Provisional application No. 61/449,305, filed on Mar. 4, 2011.

(51) Int. Cl.
G09G 5/00 (2006.01)

(52) U.S. Cl.
USPC .......................................................... 345/156

(58) Field of Classification Search
USPC .................... 345/156–184; 178/18.01–19.07; 713/150–171
See application file for complete search history.

(56) References Cited

U.S. PATENT DOCUMENTS

| | | | |
|---|---|---|---|
| 6,281,820 B1 | 8/2001 | Fields | |
| 7,551,593 B2 | 6/2009 | Haller et al. | |
| 7,738,569 B2 | 6/2010 | Quinn et al. | |
| 7,812,860 B2 | 10/2010 | King et al. | |
| 7,909,255 B2 * | 3/2011 | Young | 235/462.13 |
| 7,912,426 B2 * | 3/2011 | Masera et al. | 455/41.2 |
| 7,941,665 B2 | 5/2011 | Berkema et al. | |
| 8,024,576 B2 * | 9/2011 | Gargaro et al. | 713/183 |
| 8,116,685 B2 * | 2/2012 | Bregman-Amitai et al. | 455/41.2 |
| 8,405,729 B2 * | 3/2013 | Jain | 348/207.1 |
| 2006/0126812 A1 * | 6/2006 | Carlson et al. | 379/156 |
| 2006/0135064 A1 | 6/2006 | Cho et al. | |
| 2007/0300063 A1 | 12/2007 | Adams et al. | |
| 2008/0160914 A1 | 7/2008 | McRae et al. | |
| 2008/0248748 A1 | 10/2008 | Sangster et al. | |
| 2008/0275667 A1 | 11/2008 | Ohta | |
| 2008/0320587 A1 | 12/2008 | Vauclair et al. | |

(Continued)

FOREIGN PATENT DOCUMENTS

KR 20100122790 A 11/2010

OTHER PUBLICATIONS

Saxena et al., "Secure Device Pairing based on a Visual Channel", IACR Cryptology ePrint Archive: Report 2006/050 available at http://eprint.iacr.org/2006/050 (Feb. 2006).
Saxena et al., Secure Device Pairing based on a Visual Channel (Short Paper), Proceedings of the 2006 IEEE Symposium on Security and Privacy (IEEE. 2006).

(Continued)

*Primary Examiner* — Rodney Amadiz
(74) *Attorney, Agent, or Firm* — Anderson & Levine, L.L.P.

(57) ABSTRACT

An interactive display system including a wireless pointing device including a camera or other image capture system. Pairing of the pointing device is performed by a computerized display system displaying a visual pairing code at its display, for capture by the pointing device. The pairing code may be displayed in a form that is human-readable, human-perceptible but not human-readable, or human-imperceptible. In response to detecting the pairing code, the pointing device transmits a wireless signal to the computerized display system including the pairing code. If the pairing code received by the display system matches that originally displayed, the computerized display system authorizes the pointing device as a source of control signals in the graphical user interface manner. Various additional handshaking approaches in combination with the visual pairing procedure are disclosed.

26 Claims, 9 Drawing Sheets

U.S. PATENT DOCUMENTS

| | | |
|---|---|---|
| 2009/0006196 A1 | 1/2009 | Barkan et al. |
| 2009/0177783 A1 | 7/2009 | Adler et al. |
| 2009/0286479 A1 | 11/2009 | Thoresson et al. |
| 2009/0319673 A1 | 12/2009 | Peters |
| 2010/0012715 A1 | 1/2010 | Williams et al. |
| 2010/0060572 A1 | 3/2010 | Tsern |
| 2010/0183246 A1 | 7/2010 | King et al. |
| 2011/0028091 A1 | 2/2011 | Higgins et al. |
| 2011/0072263 A1 | 3/2011 | Bishop et al. |
| 2011/0105103 A1 | 5/2011 | Ullrich |
| 2011/0119491 A1 | 5/2011 | Nocera |
| 2011/0227827 A1 | 9/2011 | Solomon et al. |
| 2011/0258689 A1 | 10/2011 | Cohen et al. |
| 2011/0295502 A1* | 12/2011 | Faenger .................. 701/211 |
| 2012/0084571 A1* | 4/2012 | Weis et al. .................. 713/184 |
| 2012/0084846 A1* | 4/2012 | Weis et al. .................. 726/6 |
| 2012/0194435 A1* | 8/2012 | Tsai et al. .................. 345/163 |

OTHER PUBLICATIONS

McCune et al., "Seeing-is-believing: Using camera phones for human-verifiable authentication", Proceedings of the 2005 IEEE Symposium on Security and Privacy (IEEE, 2005).

PCT International Application No. PCT/US2010/027271, International Search Report, Sep. 20, 2012.

Lindell, "Attacks on the Pairing Protocol of Bluetooth v2.1", available at http://www.blackhat.com/presentations/bh-usa-08/Lindell/BH_US_08_Lindell_Bluetooth_2.1_New_Vulnerabilities.pdf, (2008).

Saxena et al., "Pairing Devices with Good Quality Output Interfaces", Proceedings of the 2008 The 28th International Conference on Distributed Computing Systems Workshops (ICDCSW '08). IEEE Computer Society, Washington, DC, USA, 382-387.

* cited by examiner

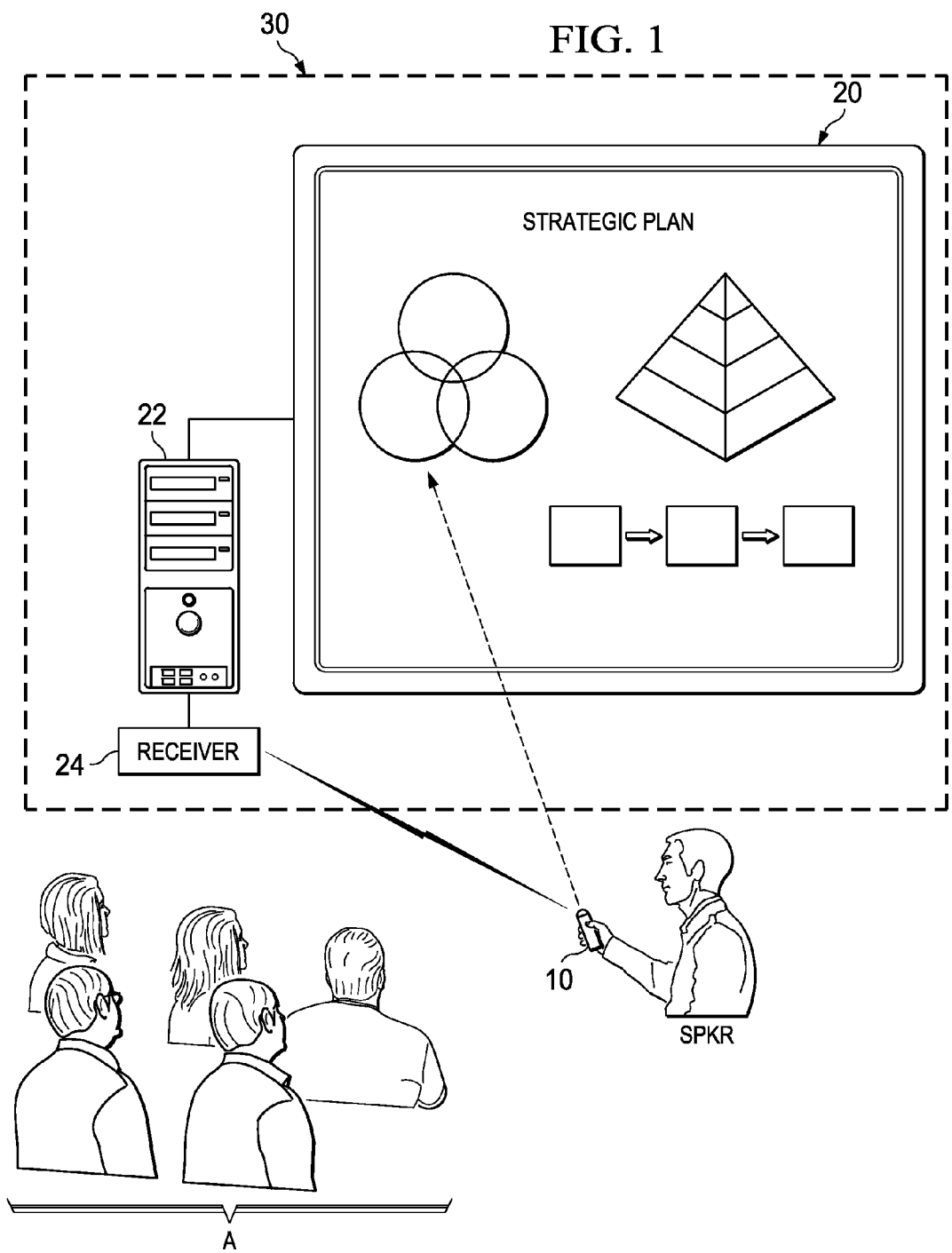

VISUAL PAIRING IN AN INTERACTIVE DISPLAY SYSTEM

CROSS-REFERENCE TO RELATED APPLICATIONS

This application claims priority, under 35 U.S.C. §119(e), of Provisional Application No. 61/449,305, filed Mar. 4, 2011, incorporated herein by this reference.

STATEMENT REGARDING FEDERALLY SPONSORED RESEARCH OR DEVELOPMENT

Not applicable.

BACKGROUND OF THE INVENTION

This invention is in the field of interactive display systems. Embodiments of this invention are more specifically directed to the pairing of a control device with the computer system that is displaying visible output.

The ability of a speaker to communicate a message to an audience is generally enhanced by the use of visual information, in combination with the spoken word. In the modern era, the use of computers and associated display systems to generate and display visual information to audiences has become commonplace, for example by way of applications such as the POWERPOINT presentation software program available from Microsoft Corporation. For large audiences, such as in an auditorium environment, the display system is generally a projection system (either front or rear projection). For smaller audiences such as in a conference room or classroom environment, flat-panel (e.g., liquid crystal) displays have become popular, especially as the cost of these displays has fallen over recent years. New display technologies, such as small projectors ("pico-projectors"), which do not require a special screen and thus are even more readily deployed, are now reaching the market. For presentations to very small audiences (e.g., one or two people), the graphics display of a laptop computer may suffice to present the visual information. In any case, the combination of increasing computer power and better and larger displays, all at less cost, has increased the use of computer-based presentation systems, in a wide array of contexts (e.g., business, educational, legal, entertainment).

A typical computer-based presentation involves the speaker standing remotely from the display system, so as not to block the audience's view of the visual information. Because the visual presentation is computer-generated and computer-controlled, the presentation is capable of being interactively controlled, to allow selection of visual content of particular importance to a specific audience, annotation or illustration of the visual information by the speaker during the presentation, and invocation of effects such as zooming, selecting links to information elsewhere in the presentation (or online), moving display elements from one display location to another, and the like. This interactivity greatly enhances the presentation, making it more interesting and engaging to the audience.

The ability of a speaker to interact, from a distance, with displayed visual content, is therefore desirable. More specifically, a hand-held device that a remotely-positioned operator could use to point to, and interact with, the displayed visual information is therefore desirable.

U.S. Patent Application Publication US 2011/0227827, published Sep. 22, 2011 and entitled "Interactive Display System", based on commonly assigned and copending application Ser. No. 13/025,015, Feb. 10, 2011, incorporated herein by reference, describes an interactive display system including a wireless pointing device including a camera or other video capture system. The pointing device captures images displayed by the computer, including one or more human-imperceptible positioning targets. The location, size, and orientation of the recovered positioning target identify the aiming point of the remote pointing device relative to the display. Temporal sequencing of the positioning targets (either human-perceptible or human-imperceptible) to position the pointing device is also described.

As is well known in the art, point-to-point communication over a conventional short-range wireless (e.g., "Bluetooth") channel involves the "pairing" of the two devices that are to communicate with one another. To summarize, conventional pairing involves the recognition of each device by the other device, and authentication in the sense that each device "trusts" the communications received from the other over the short-range wireless channel. Such pairing addresses the issue that conventional short-range wireless devices transmit and receive omnidirectionally. As such, a receiving device may receive wireless signals from devices other than the intended transmitter. Pairing avoids confusion by enabling each device to respond to wireless signals only from its intended transmitting devices, and to have its transmitted signals responded to only by its intended receiving devices.

Of course, certain applications will require some level of security in these wireless communications. In those cases, the pairing process will also include the exchange of encryption keys, so that each of the paired devices can encrypt and decrypt its wireless communications.

Conventional pairing techniques for short-range wireless communication with computer systems often incorporates "out-of-band" techniques (i.e., using both wireless communication and communication by some means other than wireless) to establish the paired relationship. These conventional techniques require each of the paired devices to authenticate the other—in other words, the device initiating the pairing authenticates the responding device, and the responding device also authenticates the initiating device.

In the context of an interactive display system, such as that described in the above-incorporated U.S. Patent Application Publication US 2011/0227827, the pairing of a pointing device with the computer system or graphics subsystem displaying and controlling the displayed output, presents a different situation from that of conventional short-range wireless communications. More specifically, the display system with which communication is desired may be deployed within wireless range of other display systems, such as in different conference rooms or classrooms. While the presenter is only interested in controlling the display system visible to him, the wireless signal transmitted by his pointing device may reach display systems in other rooms within wireless signal range. Conversely, the display system he wishes to control may be receiving control signals from pointing devices in those nearby rooms. As such, some level of pairing is necessary to avoid interference at the desired display system from other pointing devices. However, it is contemplated that the pointing device may not be nominally assigned to a particular display system but may instead belong to the presenter for use with different systems, at different locations, and at different times. For example, the pointing device may belong to a salesman for use in presentations at various customers. In that context, the ability to rapidly and easily pair pointing devices with display systems is useful. Furthermore, it is highly desirable for the pointing device to be simple in its construction and operation, with only one or two buttons (e.g., similar to a computer mouse) to attain a relatively small form factor, and with minimum RF transmission capability to conserve battery power.

BRIEF SUMMARY OF THE INVENTION

Embodiments of this invention provide an interactive display system and method of operating the same to utilize both wireless and visual information to establish one-way pairing between a pointing device and the computer system controlling the display.

Embodiments of this invention provide such a system and method in which the functionality overhead of the interacting pointing device required to establish pairing is minimized.

Embodiments of this invention provide such a system and method that are particularly suited for pairing of an interactive pointing device capable of detecting its aiming point in the displayed information.

Other objects and advantages of embodiments of this invention will be apparent to those of ordinary skill in the art having reference to the following specification together with its drawings.

This invention may be embodied into an interactive display system, and method of operating the same, in which the display system pairs with a pointing device by way of a pairing code displayed in a manner that is visible to the pointing device. Upon receipt of the displayed pairing code, for example by way of a camera and image processing function within the pointing device, the pointing device transmits a wireless or other electrical signal to the display system that includes an indication of the received pairing code. In response to receiving the signal from the pointing device, the display system grants control of its functionality to the pointing device.

BRIEF DESCRIPTION OF THE SEVERAL VIEWS OF THE DRAWING

FIG. 1 is a schematic perspective view of a speaker presentation being carried out using an interactive display system according to embodiments of the invention.

DETAILED DESCRIPTION OF THE INVENTION

Figure 2A:
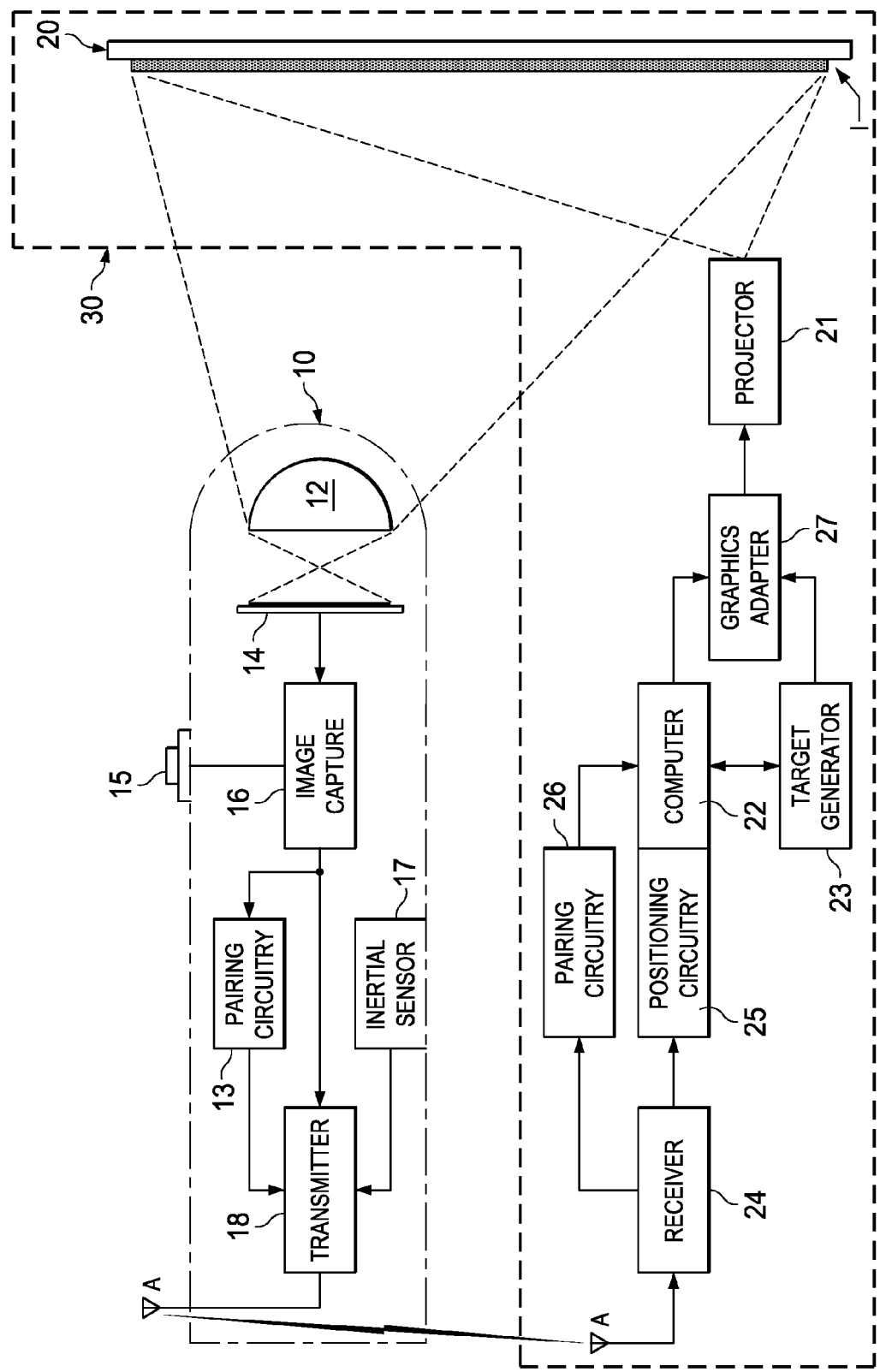
FIGS. 2a and 2b are electrical diagrams, in block form, each illustrating an interactive display system according to an embodiment of the invention.

This invention will be described in connection with one or more of its embodiments, namely as implemented into a computerized presentation system including a display visible by an audience, as it is contemplated that this invention will be particularly beneficial when applied to such a system. However, it is also contemplated that this invention can be useful in connection with other applications, such as in gaming systems, general input by a user into a computer system, and the like. Accordingly, it is to be understood that the following description is provided by way of example only, and is not intended to limit the true scope of this invention as claimed.

FIG. 1 illustrates a simplified example of an environment in which embodiments of this invention are useful. As shown in FIG. 1, speaker SPKR is giving a live presentation to audience A, with the use of visual aids that are generated and presented by display system 30. Typically, those visual aids are in the form of computer graphics and text generated by computer 22, and displayed on room-size graphics display 20, in a manner visible to audience A. As known in the art, such presentations are common in the business, educational, entertainment, and other contexts, with the particular audience size and system elements varying widely. The simplified example of FIG. 1 illustrates a business environment in which audience A includes several or more members viewing the presentation. The size of the environment may vary from an auditorium, seating hundreds of audience members, to a single desk or table in which audience A consists of a single person.

The types of display 20 used for presenting the visual aids to audience A varies according to the presentation environment. For use before medium to large audiences, display 20 may be a projection display, or an external flat-panel display, such as of the plasma or liquid crystal (LCD) type, in either case driven by a graphics adapter in computer 22. For presentations to one or two audience members, computer 22 in the form of a laptop or desktop computer may simply use its own display 20 to present the visual information. Also for smaller audiences A, hand-held projectors (e.g., "pocket projectors" or "pico projectors") are becoming more common, in which case the display screen may be a wall or white board.

The presentation may be generated and presented by way of conventional presentation software, such as the POWERPOINT software program available from Microsoft Corporation, executed by computer 22. Alternatively, the particular visual information need not be a previously created presentation executing at computer 22, but instead may be a web page accessed via computer 22; a desktop display including icons, program windows, and action buttons; video or movie content from a DVD or other storage device being read by computer 22; or even a blank screen as a "white board" (on which speaker SPKR may "draw" or "write" using pointing device 10). Other types of visual information useful in connection with embodiments of this invention will be apparent to those skilled in the art having reference to this specification.

As shown in FIG. 1, and as described, by way of example, in the above-incorporated U.S. Patent Application Publication US 2011/0227827, speaker SPKR remotely and interactively controls the operation of the presentation or other visual output by display system 30 by way of pointing device 10, which is capable of capturing all or part of the image at display 20 and of interacting with a pointed-to (or aimed-at) target location of that image. Pointing device 10 in this example wirelessly communicates this pointed-to location of display 20 and other user commands from speaker SPKR, to receiver 24 of display system 30, and in turn to computer 22. In this manner, according to embodiments of this invention, remote interactivity with the displayed content is carried out.

FIG. 2a shows a generalized example of the construction of an interactive display system useful in an environment such as that shown in FIG. 1, and as described in the above-incorporated U.S. Patent Application Publication US 2011/0227827, by way of its major constituent components of pointing device 10 and display system 30. In this example, display system 30 includes computer 22 having the appropriate functionality for generating the "payload" images to be displayed at display screen 20 by projector 21, such payload images intended for viewing by the audience. In its payload image generation function, computer 22 will generate or have access to the visual information to be displayed (i.e., the visual "payload" images), for example in the form of a previously generated presentation file stored in memory, or in the form of active content such as computer 22 may retrieve over a network or the Internet. In addition, as described in the above-incorporated U.S. Patent Application Publication US 2011/0227827, the payload image frame data from computer 22 is combined with positioning target image content generated by target generator function 23 that, when displayed at graphics display 20, can be captured by pointing device 10 and used by positioning circuitry 25 to deduce the location pointed to by pointing device 10. Graphics adapter 27 includes the appropriate functionality suitable for presenting a sequence of frames of image data, including the combination of the payload image data and the positioning target image content, in the suitable display format, to projector 21. Projector 21 in turn projects the corresponding images I at display screen 20, in this projection example.

The particular construction of display system 30, and its constituent components computer 22, positioning circuitry 25, target generator circuitry 23, and graphics adapter 27, can vary widely. Examples of computer 22 include a single personal computer or workstation (in desktop, laptop, or other suitable form), including the appropriate processing circuitry for generating the payload images, generating the positioning target, combining the two prior to or by way of graphics adapter 27, and receiving and processing data from pointing device 10 to determine the pointed-to location of the displayed image. Alternatively, it is contemplated that separate functional systems external to computer 22 may carry out one or more of the functions of target generator 23, receiver 24, and positioning circuitry 25, and perhaps graphics adapter 27 itself. Other various alternative implementations of these functions are also contemplated. In any event, it is contemplated that computer 22, positioning circuitry 25, target generator 23, and other functions involved in the generation of the images and positioning targets displayed at graphics display 20, will include the appropriate program memory in the form of computer-readable media storing computer program instructions that, when executed by its processing circuitry, will carry out the various functions and operations of embodiments of the invention as described in this specification. It is contemplated that those skilled in the art having reference to this specification will be readily able to arrange the appropriate computer hardware and corresponding computer programs for implementation of these embodiments of the invention, without undue experimentation.

Pointing device 10 in this example includes a camera function consisting of optical system 12 and image sensor 14. With pointing device 10 aimed at display 20, image sensor 14 is exposed with all or part of image I at display 20, depending on the distance between pointing device 10 and display 20, the focal length of lenses within optical system 12, and the like. Image capture function 16 includes the appropriate circuitry known in the art for acquiring and storing a digital representation of the captured image at a particular point in time selected by the user, or as captured at each of a sequence of sample times. Pointing device 10 also includes actuator 15, which is a conventional push-button or other switch by way of which the user of pointing device 10 can provide user input in the nature of a mouse button to actuate an image capture, or for other functions as will be described below and as will be apparent to those skilled in the art. In this example, one or more inertial sensors 17 may also be included within pointing device 10 to assist navigation relative to detection of the pointed-to location of display 20, or to enhance user interaction with the displayed content. Examples of such inertial sensors include accelerometers, magnetic sensors (i.e., for sensing orientation relative to the earth's magnetic field), gyroscopes, and other inertial sensors.

In this example of FIG. 2a, pointing device 10 is operable to forward, to positioning circuitry 25, signals that correspond to the captured image acquired by image capture function 16. This communications function is performed by wireless transmitter 18 in pointing device 10, along with its internal antenna A, by way of which radio frequency signals (e.g., according to a conventional standard such as Bluetooth or the appropriate IEEE 802.11 standard, or according to a proprietary wireless protocol) are transmitted. Transmitter 18 is contemplated to be of conventional construction and operation for encoding, modulating, and transmitting the captured image data, along with other user input and control signals via the applicable wireless protocol. In this example, receiver 24 is capable of receiving the transmitted signals from pointing device 10 via its antenna A, and of demodulating, decoding, filtering, and otherwise processing the received signals into a baseband form suitable for processing by positioning circuitry 25.

According to embodiments of this invention, pointing device 10 also includes pairing circuitry 13. Pairing circuitry 13 corresponds to such programmable or custom logic circuitry programmed or otherwise operable, as the case may be, to detect and decode certain information displayed within part of image I at display 20, as useful in "pairing" pointing device 10 with computer 22. As such, pairing circuitry 13 receives image data from image capture function 16, and forwards signals corresponding to pairing information contained in those image data to transmitter 18, according to embodiments of this invention. From a hardware standpoint, pairing circuitry 13 may be implemented within the same physical integrated circuit as image capture 16 or transmitter 18 (or both), or alternatively may be realized by other circuitry within pointing device 10 including general control and processing circuitry that may be provided therein. In addition, specific pairing circuitry 26 may be implemented within display system 30, for managing pairing and authorization functions performed by display system 30 in response to wireless signals from pointing device 10, as will be described below. Alternatively, it is contemplated that computer 22 or other programmable functions within display system 30 may manage those pairing and authorization functions.

Figure 2B:
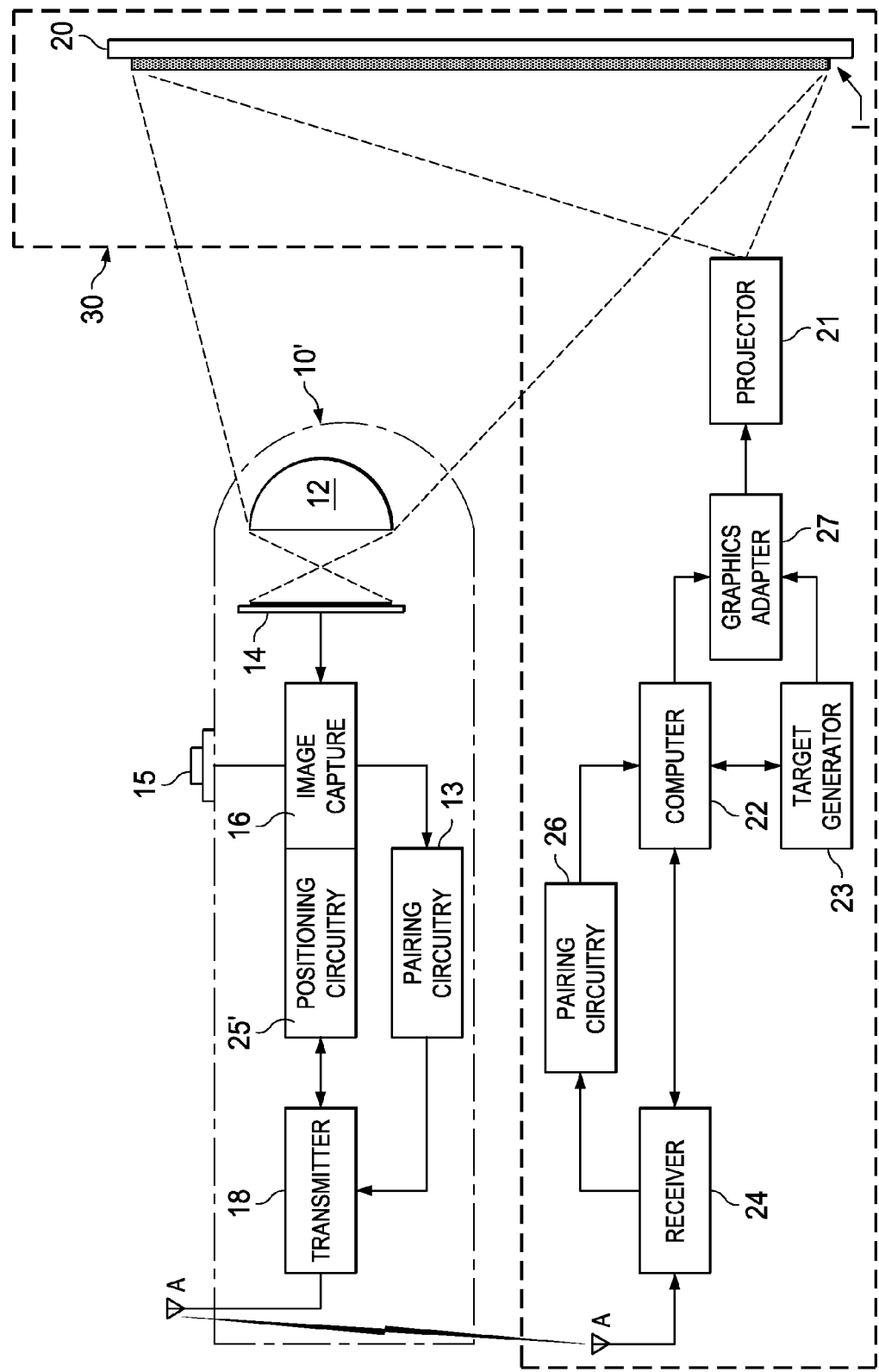

FIG. 2b illustrates an alternative generalized arrangement of interactive display system 30' according to embodiments of this invention. This system includes projector 21 and display 20 as before, with projector 21 projecting payload image content and positioning target image content generated by computer 22 as described above. In this example, pointing device 10' performs some or all of the computations involved in determining the location of display 20 at which it is currently pointing. As such, in addition to a camera (lens 12, image sensor 14, and image capture 16), positioning device 10' includes positioning circuitry 25', along with pairing circuitry 13 and wireless transmitter 18. Computer 22 is coupled to receiver 24, as before. Pairing circuitry 26 may also be implemented within display system 30' as mentioned above, for managing pairing and authorization functions performed in response to wireless signals from pointing device 10'; alternatively, these pairing and authorization functions may be performed by computer 22.

In a general sense, positioning circuitry 25' determines the location of display 20 at which it is aimed by comparing positioning target image content contained within captured image I acquired at its image sensor 14 and image capture 16, with positioning target image information stored in its memory. For example, positioning circuitry 25' may, a priori, store image data corresponding to the nominal shape and size of the positioning target to be displayed at display 20, so that it can compare captured images with that positioning target image. Alternatively, transmitter 18 and receiver 24 may be each be implemented as transceivers, capable of both receiving and transmitting wireless communications with one another, in which case data corresponding to the size, shape, and position of the positioning targets as displayed at display 20 can be transmitted to pointing device 10' for comparison. In either case, the system of FIG. 2b, with the distribution of at least a portion of positioning circuitry 25' at pointing device 10', results in a somewhat different overall operation, as is described in the above-incorporated U.S. Patent Application Publication US 2011/0227827.

Figure 3:
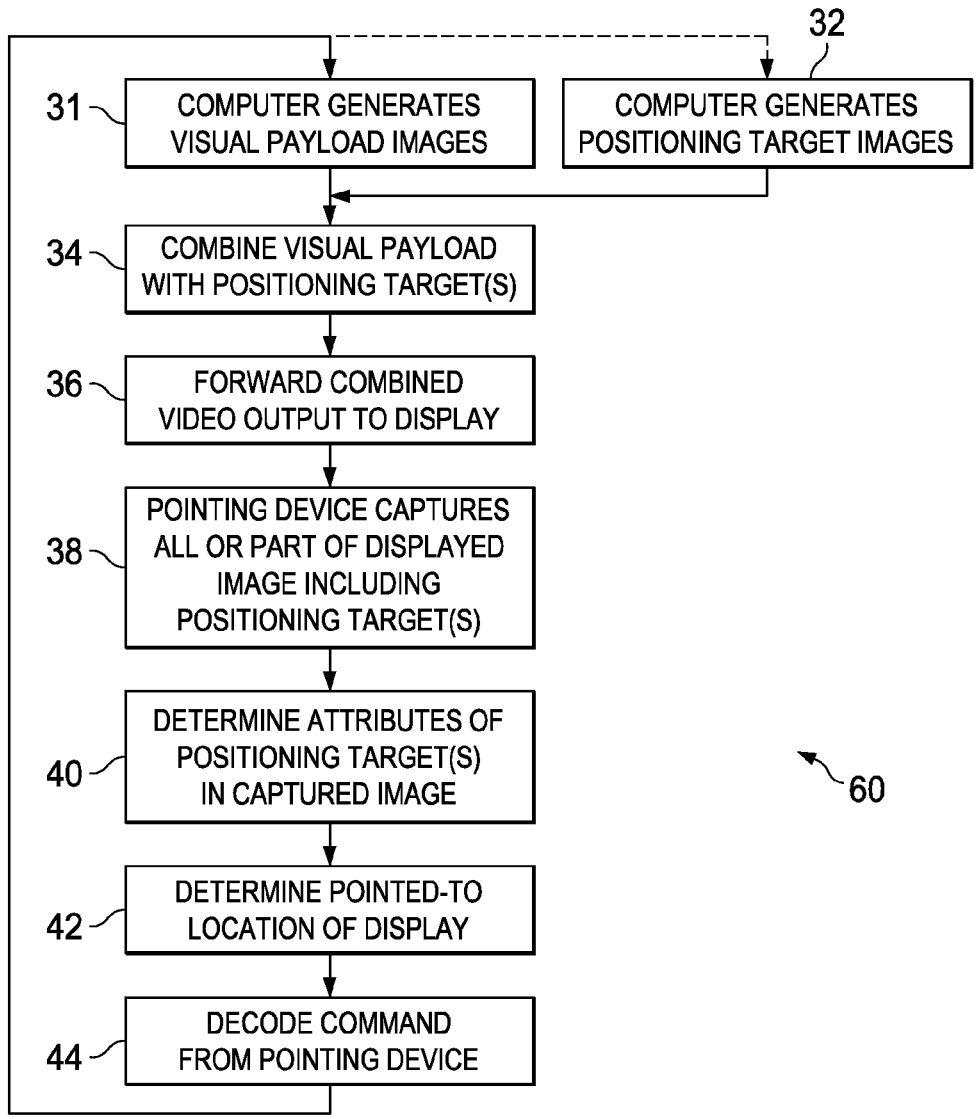
FIG. 3 is a flow diagram illustrating the generalized operation of an interactive display system into which embodiments of the invention may be deployed.

The operation of the interactive display system according to embodiments of the invention is fully described, in the above-incorporated U.S. Patent Application Publication US 2011/0227827. To briefly summarize, referring to FIG. 3, once pointing device 10 is paired with display system 30, 30' (collectively referred to as display system 30 for purposes of this specification) including computer 22, receiver 24, and such accompanying circuitry provided with computer 22 to generate the displayed image, pointing device 10 is capable of communicating with computer 22. In operation, display system 30 generates visual payload image data for display at display 20 in process 31, such payload image data corresponding to human-perceptible content that constitutes the visual component of the presentation. Along with this visual payload image data, in process 32, target generator function 23 generates positioning target images that will also be displayed on display 20 along with the visual payload image data; those positioning target images may either be perceptible or imperceptible to audience A; in either case, the positioning targets will be perceptible to pointing device 10. Computer 22 or graphics adapter 27, depending on the architecture of display system 30, combines the visual payload image data and the positioning target image data into a form suitable for display at display 20 in process 34, for example in the form of one or more "frames" of graphics or video data in the conventional sense. Those combined frames are forwarded to projector 21 for output at display 20, or to graphics display 20 itself, depending on the display technology utilized, in process 36.

Pointing device 10 is then capable of controlling the presentation in the manner of a graphical user interface (GUI), by capturing at least part of the image being displayed at display 20, including one or more of the positioning targets in the displayed image, in process 38. In process 40, pointing device 10 determines attributes of the positioning target image contained within the captured image, and from those attributes determines the location of displayed image I at which pointing device 10 was pointing at the time of the image capture in process 42. That location and any accompanying control signals (i.e., pressing of actuator 15) are then transmitted to receiver 24, for communication to computer 22. Computer 22 can then decode a GUI command given by the user via pointing device 10, for example "select", click-and-drag, double-click, right-click, zooming in or out of the displayed content, page turning, and the like. Other examples of these GUI commands may include drawing of free-hand images, or the writing of free-hand text, through use of pointing device 10, either on displayed content (for example to highlight or comment on that content), or on a blank "white board" display. Upon display system 30 decoding the user command in this manner in process 44, the interactive display system repeats the operation, for example by generating new visual payload image content to be displayed in response to the received user command, in process 30. Optionally, positioning targets may be generated and combined into the next displayed image, in response to the decoded command as appropriate. The presentation proceeds in this manner.

The operation of an interactive display system as summarized above, and for example as described in the above-incorporated U.S. Patent Application Publication US 2011/0227827, presumes that pointing device 10 and display system 30, 30' (collectively referred to as display system 30 for purposes of this specification) are paired with one another, in the sense that display system 30 responds to control signals that it receives from pointing device 10. For purposes of this description, those control signals are wireless communications, for example as transmitted by transmitter 18 of pointing device 10 to receiver 24 of display system 30 as shown in FIG. 2a. Those skilled in the art having reference to this specification will recognize that other communications facilities may also be used in embodiments of this invention.

Embodiments of this invention are particularly well-adapted for the environment of the interactive display system of FIG. 1, and the manner in which that interactive display system is used and operated. In many environments, multiple presentations may be ongoing simultaneously within some proximity of one another. For example, classroom buildings are typically constructed with several classrooms in close proximity with one another, more specifically within short-range wireless signal range of one another. Similarly, conference centers or other areas of office buildings often have several conference rooms in close proximity of one another. In those situations, conventional short-range wireless signals transmitted from a given pointing device can be received by multiple receivers, not only by the receiver within the display system in the same room, but also by receivers in display systems in other rooms. Of course, since a pointing device in one room cannot view displays in other rooms, a display system should not respond to signals emanating from a room other than its own. Furthermore, it is contemplated that the pointing devices may not be strictly "assigned" to specific display systems. Rather, it is contemplated that pointing devices may be personal to individual users, such that a given user may use the same pointing device for presenting at many different locations, to control presentations given at different display systems.

It has been discovered, in connection with this invention, that a need exists to easily, rapidly, and reliably pair a particular pointing device as a legitimate source of control signals to the computer of a display system, using the ability of that pointing device to view the display of that system as the qualifying attribute. Conversely, the display system should not authorize, as legitimate sources of control signals, those pointing devices that cannot view its display. Embodiments of this invention provide such a pairing capability, as will be described in further detail below.

It has been further discovered, in connection with this invention, that there is no particular need for a pointing device to authorize or otherwise authenticate the display system that it will be controlling, once paired. In operation, the user will be controlling the operation of the computer that is generating and presenting the presentation in the manner of a graphical user interface (GUI). In other words, control of the presentation is based on graphical elements that are currently being displayed, as viewed by the user and with which the user can interact using the pointing device. The user will thus have knowledge that the computer that is responding to the control signals issued from the pointing device (as evident by changes in the displayed output), is the computer that is to be so controlled. Furthermore, it has been discovered, in connection with this invention, that little, if any, security of the GUI control signals transmitted by the pointing device is necessary. For example, according to the description provided in the above-incorporated U.S. Patent Application Publication US 2011/0227827, the content of the control signals transmitted by pointing device 10, 10' can be limited to such information as a particular location (x-y coordinates) of the displayed image, or data including one or more positioning targets and attributes thereof, depending on the implementation, along with a "click" (perhaps with one or more options, such as "right-click", etc.) to convey the desired action. Informational content in those wireless control signals is therefore extremely limited, if present at all. Therefore, the user of the interactive display system will typically have little concern about whether those wireless control signals are somehow "snooped" from outside of the particular presentation. As a result, these control signals need not be encrypted, nor their receipt restricted to a particular destination display system.

As a result of these discoveries and observations, made in connection with this invention, embodiments of this invention provide pairing capability, for applications such as an interactive display system, that can be realized with minimum computational and other functionality deployed in the pointing device, with minimal load on the wireless transmitter in that pointing device, and without requiring additional input capability (such as a keypad) to be added to the pointing device. As a result, the cost of the pointing device can be minimized, battery power can be conserved, and the form factor of the pointing device can be kept to a minimum and in an aesthetically pleasing shape.

Figure 4A:
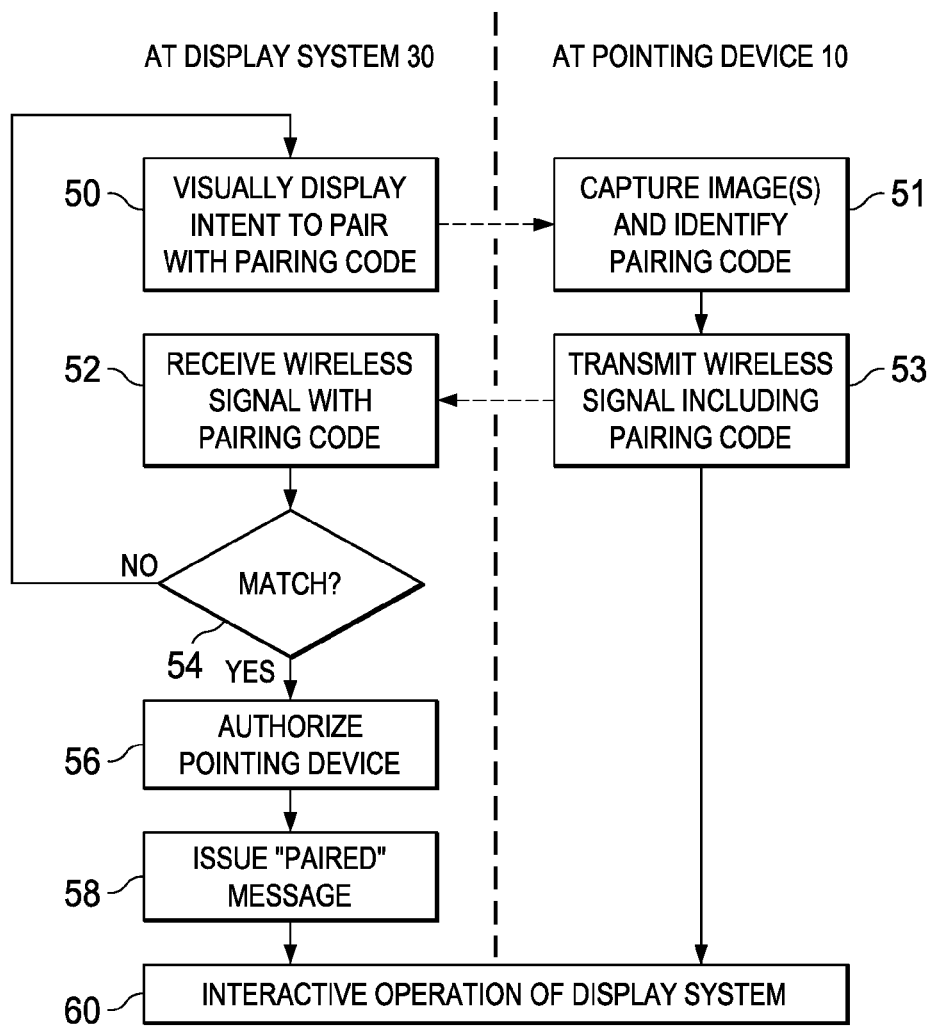
FIGS. 4a through 4e are flow diagrams illustrating the operation of the pairing of a pointing device with a display system, in the interactive display system of FIG. 1, according to respective embodiments of the invention.
Figure 4B:
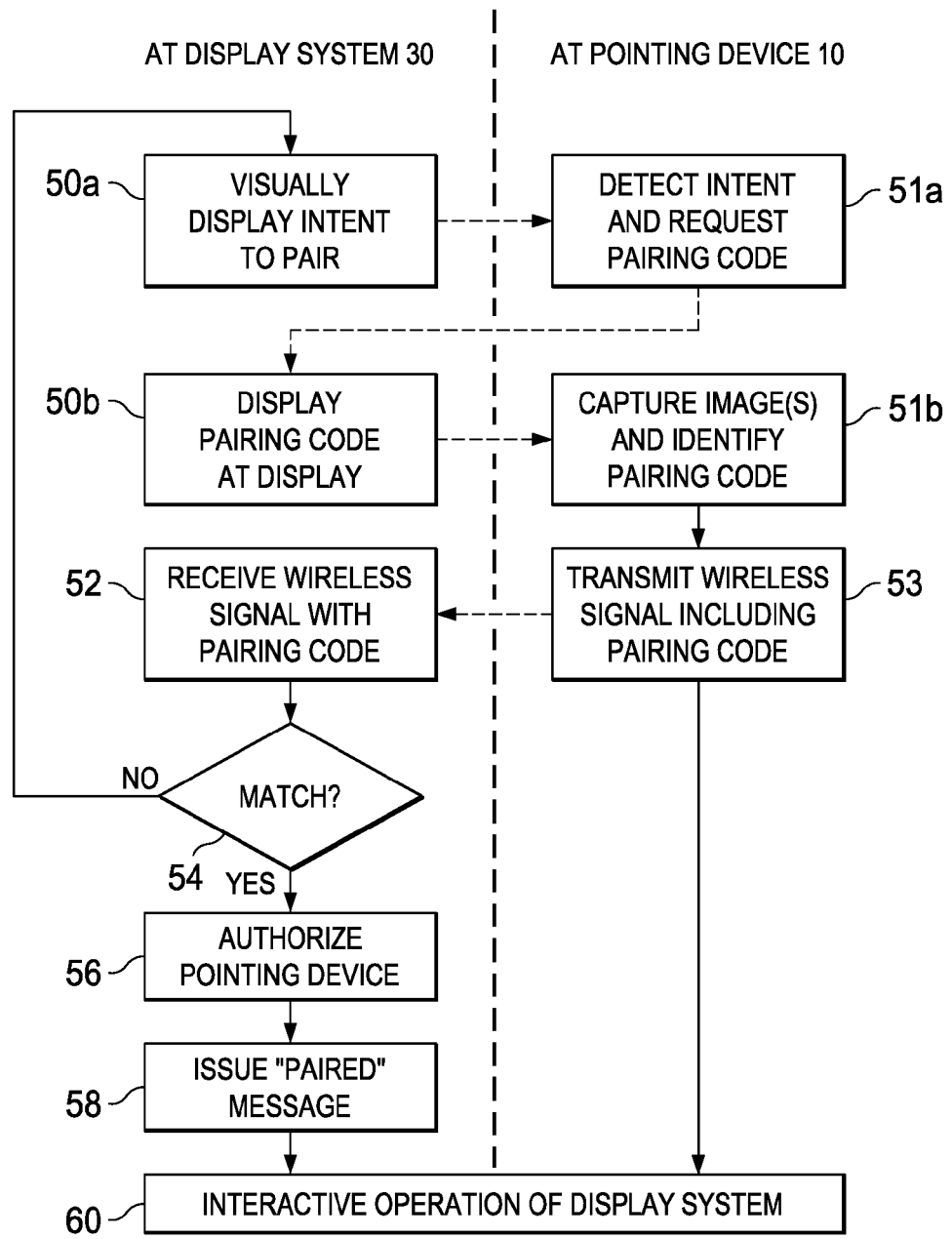
Figure 4C:
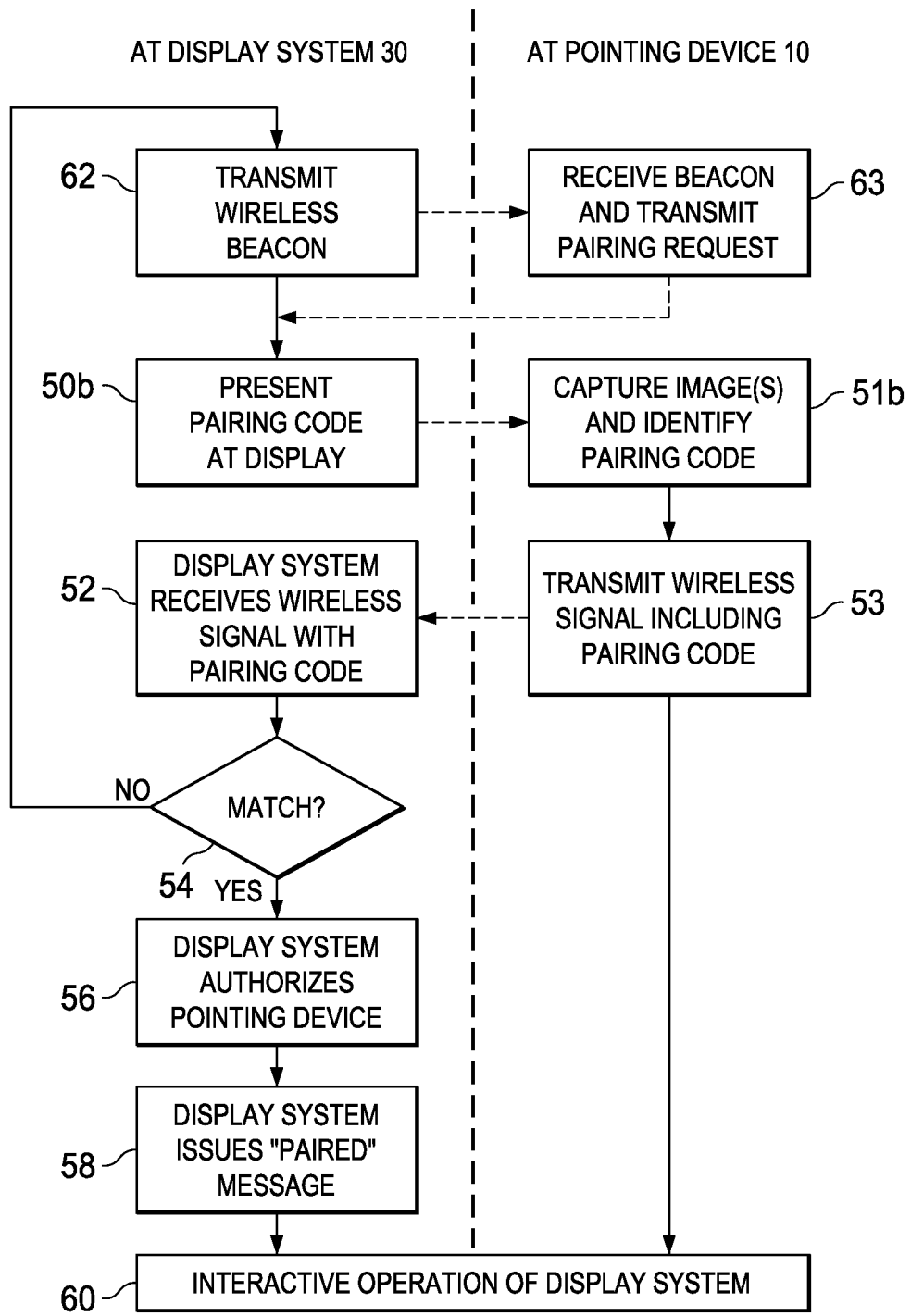

Referring now to FIGS. 4a through 4c, the operation of pointing device 10 and display system 30 in carrying out visual pairing according to embodiments of this invention will be described in further detail. As discussed above, it is contemplated that those skilled in the art having reference to this specification will be readily able to implement these process steps within the circuit and computational functionality of the pointing device and display system as constructed and arranged according to specific applications and architectures. As such, the operation of FIGS. 4a through 4c according to embodiments of this invention will be described in connection with pointing device 10 and display system 30 of FIG. 2a, by way of example. It is of course contemplated that similar functionality will directly apply to pointing device 10' and display system 30' of FIG. 2b, and will also readily apply to those alternative architectures and implementations as arranged by those skilled in the art having reference to this specification, such alternatives and variations being within the scope of this invention.

The operation of the interactive display system of FIG. 2a according to the procedure shown in FIG. 4a begins with process 50, in which display system 30 displays, at its display 20, images that include an indication that display system 30 intends to pair with a pointing device 10 in its vicinity (i.e., within line-of-sight of display 20), and that include a pairing code for use in that pairing. The images generated and displayed by display system 30 in process 50 are images that are encoded in such a manner that the image data captured by the camera function of pointing device 10 (i.e., optical system 12, image sensor 14, and image capture function 16) can be decoded by pairing circuitry 13 or other functionality in pointing device 10 to recover the intent to pair message and the pairing code. If desired, the pairing code itself may also serve as an intent-to-pair code; in this case, the display of a pairing code implicitly means that display system 30 intends to pair with a pointing device. The intent-to-pair message can be useful, however, in those implementations in which the pairing code is not sufficiently distinctive from other image data displayed by display system 30, in which case the intent-to-pair message can alert pointing device 10 to consider certain images as the pairing code.

More specifically, it is contemplated that display system 30 may execute process 50 in its display of the intent to pair and pairing code in any one of a number of various ways. Because the images containing these messages need only be viewed and responded to by pointing device 10, it is not essential that the images generated and displayed in process 50 be human-perceptible or human-readable (i.e., alphanumeric). Rather, it may be preferable in many cases for the images of process 50 to be coded in such a way as to be easily interpreted by pairing circuitry 13 in pointing device 10. Examples of images that may be used as the intent to pair and pairing code (or, if desired, both messages combined into a single message) include the well-known UPC bar codes, 2-D matrix barcodes such as "QR" codes, and the like. Proprietary or specialized patterns encoding these messages may of course also be used. These machine-readable codes may be displayed at graphics display 20 in the conventional manner, so as to be visible to audience A, or may be displayed in a human-imperceptible manner, for example by way of patterned modulation of light intensity of alternating polarity in alternating frames, so as to be perceptible by pointing device 10 but not by audience A, as described in the above-incorporated U.S. Patent Application Publication US 2011/0227827; in this example, pairing circuitry 13 may include the capability of subtracting successive frames of captured image data to recover the patterns of alternating polarity modulation while the human-visible content cancels out. In some implementations and environments, it may be useful for a human-visible indication at graphics display 20 that pairing is occurring, for example to alert the user and audience of that event (e.g., to enable cancellation of the pairing process if being attempted by an interfering or otherwise unauthorized device).

Figure 5:
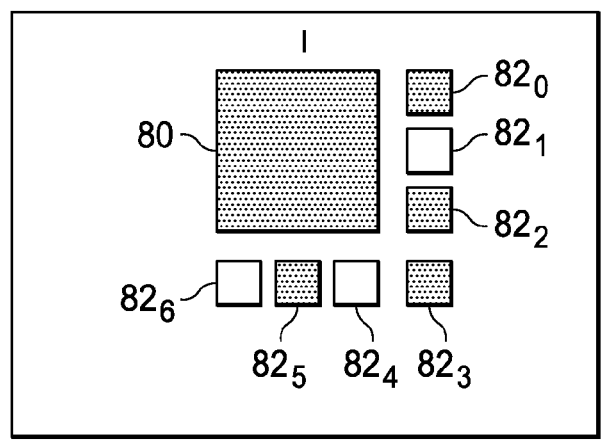
FIG. 5 is an illustration of an example of a pairing code displayed in a manner visible to a pointing device, by an interactive display system constructed and operating according to embodiments of this invention.

FIG. 5 illustrates an example of a graphical visual pairing code suitable for use in connection with embodiments of this invention. This particular visual pairing code is perceptible by pointing device 10, and may be displayed by display system 30 in a form in image I that is either human-perceptible (i.e., as visible images at display 20) or human-imperceptible, such as described in the above-incorporated U.S. Patent Application Publication US 2011/0227827. The visual code of FIG. 5 includes element 80 and code bits $82_0$ through $82_6$. Element 80 is a relatively large, and thus easily detected, visual element that serves the purpose of indicating the existence, location, and orientation of a graphical pairing code at display 20. In this example, as evident from FIG. 5, element 80 is a large black square. Code bits $82_0$ through $82_7$ are seven additional smaller elements in this example, arranged around a corner of element 80. In this example, each of code bits $82_0$ through $82_6$ may take either a "0" (white) or "1" (black) value, and as such constitute a binary word when considered in sequence. The "0" white code bits (e.g., code bits $82_6$, $82_4$, $82_1$ in FIG. 5) may be represented by increased luminance, or by the absence of modulation at those locations (in either case, presented with or without the visible borders shown in FIG. 5). Typically, some convention is established for interpretation of this code. For example, the code may be considered by the order of code bits $82_0$ through $82_6$ taken sequentially in a specific direction, with code bit $82_3$ at the corner of element 80 being the middle bit of the code word. The arrangement of code bits $82_0$ through $82_6$ as around a single corner of element 80 allows the code to be independent of its rotational orientation. In the example of FIG. 5, for the case in which the convention considers the code word in a counter-clockwise direction (MSB first), the code word value is $0101101_2$. Multiple instances of the visual code of varying size may be displayed within image I simultaneously or in sequence, to enable pairing of pointing device 10 over a wide range of distances from display 20.

Referring back to FIG. 4a, at the point in time at which process 50 is being performed, display system 30 is necessarily unaware of the location of pointing device 10 relative to graphics display 20, or even whether any pointing device is in the vicinity of display 20. As such, it is contemplated that the manner in which the images of process 50 are presented are suitable for capture by pointing device 10 over a wide range of distances between it and display 20. The interactive display system described in the above-incorporated U.S. Patent Application Publication US 2011/0227827 enables the operation of its pointing device over such a wide range of distances from the display, and as such is particularly well-suited for use in connection with embodiments of this invention. Alternatively, process 50 may be carried out in other ways to support pairing, for example by displaying the images of process 50 at various sizes to facilitate capture by pointing device 10 over that wide range of distances relative to display 20. Further in the alternative, the user of the interactive display system of embodiments of this invention may be instructed to position pointing device 10 at a particular distance from display 20 during pairing, or to aim pointing device 10 at a particular location of display 20 (e.g., the center of image I, or at one of its corners) to successfully capture the pairing code. Other approaches in the display of the images carried out in process 50 will also be apparent to those skilled in the art having reference to this specification.

In any event, it is contemplated that process 50 may be carried out by any visual output approach to conveying the intent of display system 30 to pair with a pointing device 10, and a visually displayed (whether human-perceptible or not) pairing code for such pairing.

Following or during the visual display of the intent-to-pair message and the pairing code in process 50, pointing device 10 captures images displayed at graphics display 20 in process 51. The manner in which pointing device 10 captures these images depends on the construction of pointing device 10. In the example described above and in the above-incorporated U.S. Patent Application Publication US 2011/0227827, a camera function, including optical system 12, image sensor 14, and image capture circuit function 16, is included within pointing device 10, for sensing visual images at display 20 and generating digital data corresponding to those images. Alternatively, pointing device 10 may capture images in process 51 by way of photo resistors or other photo-detectors (e.g., photo-diodes in the visible light, infrared, or other spectrum), and the like. The image capture of process 51 may be performed by pointing device 10 in response to the user pressing actuator 15, continuously, or automatically (e.g., when triggered by inertial sensors within pointing device 10 indicating that it has been picked up from a table).

Also in process 51, for the example of pointing device 10, 10' described above, pairing circuitry 13 receives and interprets the data generated by image capture circuit function 16 corresponding to the captured images, to detect the presence of an intent-to-pair message and the pairing code. The manner in which this image data interpretation is carried out by pairing circuitry 13 of course depends on the nature of the displayed images conveying this information.

Upon detecting the pairing code, pairing circuitry 13 forwards data to transmitter 18 including the detected pairing code, which transmitter 18 forwards to display system 30 by way of a wireless signal, in process 53. In a general sense, the wireless signal transmitted in process 53 is an electromagnetic signal, such as a radio frequency signal, typically including a carrier waveform modulated by information signal. It is contemplated that the selection of the particular modulation and transmission approach for this wireless signal is unimportant for purposes of embodiments of this invention. As such, the particular modulation format in which transmitter 18 transmits the wireless signal including the pairing code will depend on the implementation. This transmitted wireless signal need not explicitly replicate the pairing code itself, but should include information from which the pairing code detected by pointing device 10 at display 20 can at least be decoded or deduced at computer 22. In addition, it is contemplated that this wireless signal will include some identifying information regarding pointing device 10, either explicitly including a device identifier in a header portion of the wireless signal, or implicitly identifying the specific pointing device 10 by way of a particular frequency or modulation code with which the wireless signal is transmitted.

In process 52, receiver 24 of display system 30 receives the wireless signal transmitted by pointing device 10, including information corresponding to the pairing code that it interpreted from the captured images. In decision 54, pairing circuitry 26 within display system 30 (or alternatively circuitry or functionality within computer 22) determines whether the pairing code received in process 52 matches the pairing code displayed in process 50. If not (decision 54 is "no"), the wireless signal received in process 52 does not correspond to a pointing device with which display system 30 wishes to pair, such as a pointing device in a different room (i.e., not in line-of-sight proximity with display 20). If the pairing code received in process 52 matches the pairing code displayed in process 50 (decision 54 is "yes"), display system 30 authorizes pointing device 10 as a legitimate source of control signals, in response to which computer 22 will operate in the conventional GUI fashion. For example, pairing circuitry 26 may set a register value within computer 22 to indicate this authorization; other authorization techniques may alternatively be used. It is contemplated that the explicit or implicit identification of pointing device 10 within the wireless signal received in process 52, allows display system 30 to identify which pointing device 10 is authorized, such that it can identify subsequent control signals from pointing device 10 to the exclusion of signals from other wireless transmitters (i.e., pointing devices 10 not paired with display system 30).

In process 58, display system 30 may issue a message to newly-paired pointing device 10, or to its user, indicating that pointing device 10 is now authorized to control computer 22. The particular form or manner of this "paired" message can vary from an alert in the human-perceptible graphics output at display 20, a wireless signal (if pointing device 10 is equipped with wireless receiver capability), or any other suitable technique. The human-perceptible graphics output is attractive, as it would also alert the user if another pointing device became paired with display system 30 during the presentation (e.g., if a member of audience A wished to also interact with the presentation).

In any case, following authorization process 56, interactive operation of display system 30 under the control of GUI commands issued by pointing device 10 is carried out in process 60. This interactive operation includes, in this GUI context, the identifying and determining of the location of display 20 pointed-to by pointing device 10 in combination with other actions (e.g., "clicking" of actuator 15), for example in the manner described in the above-incorporated U.S. Patent Application Publication US 2011/0227827, the interpreting of these commands by computer 22, and the resulting response to those commands.

As evident from this description, the pairing process for this interactive display system does not require pointing device 10 to authorize or otherwise display system 30 for wireless communications. The only information necessary for pointing device 10 to pair with display system 30 can be fully conveyed by way of the visual information at display 20. But in this interactive display system environment, pointing device 10 is only interested in controlling the content at display 20 in its field of view. As such, visibility of the pairing code at display 20 is sufficient for pointing device 10 to select display system 30 as its intended destination of control signals. Pointing device 10 therefore does not require wireless receiver circuitry, nor functionality for demodulating, decoding, and interpreting received wireless signals, nor does it require auxiliary input devices (keyboard, etc.) for communicating the pairing code to display system 30. As such, the complexity and thus cost of pointing device 10 can be kept to a minimum, along with its form factor and battery power requirements.

FIG. 4b illustrates a variation to the pairing procedure described above in connection with FIG. 4a, in which display system 30 displayed the intent-to-pair message and pairing code in process 50. As mentioned above, those messages could be displayed simultaneously, or pairing code may be presented within a certain temporal interval relative to the intent-to-pair message. In FIG. 4b, display system 30 and pointing device 10 perform at least some minimal "handshaking" prior to display of the pairing code.

As shown in FIG. 4b, the pairing procedure begins with process 50a, in which display system 30 visually displays an intent-to-pair message at graphics display 20. As before, this intent-to-pair message may be human-readable, human-perceptible but not human-readable, or human-imperceptible. In response, process 51a is then performed at pointing device 10 to detect the intent-to-pair message at graphics display 20, and to transmit a wireless signal encoded as a request for a pairing code, essentially as an "acknowledgement" of the intent of display system 30 to pair. Process 51a may be performed in an "automatic" manner (i.e., without requiring user intervention) by pointing device 10, by way of its image capture of a pattern or image at graphics display 20 and signal generation of the appropriate signal by pairing circuitry 13 and transmitter 18. Alternatively, process 51a may be user-driven, in that the user of pointing device 10 sees the intent-to-pair message at display 20, and presses actuator 15 or invokes some other command at pointing device 10 to cause its transmitter 18 to transmit the wireless request signal. Other approaches to process 51a are also contemplated.

In response to receiving the wireless request signal, display system 30 generates and displays a pairing code at its graphics display 20, in process 50b. The pairing code may be displayed in process 51a according to any of the various approaches described above in connection with FIG. 4a. And in process 51b, the camera function within pointing device 10 captures images from display 20, and pairing circuitry 13 identifies the pairing code from those captured images. In process 53, transmitter 18 of pointing device 10 transmits a wireless signal including the identified pairing code, for receipt by display system 30 (process 52), comparison (decision 54), and, if matching the pairing code as displayed in process 50b, authorization (process 56) of pointing device 10.

This embodiment of the invention thus inserts an additional handshaking step into the pairing procedure. This handshaking allows display system 30 to generate and display the pairing code only when necessary, relieving its computational and graphics functionality from the burden of repeatedly generating and displaying the pairing code except during the relevant time required for pairing.

As discussed above, embodiments of this invention eliminate the need for wireless receiver circuitry to be implemented within pointing device 10. However, if such wireless receiver functionality is provided within pointing device 10, additional handshaking and communications can be carried out during the pairing process, an example of which will now be described in connection with FIG. 4c.

The pairing procedure begins, in this example, with process 62 in which display system 30 transmits a wireless "beacon" signal indicating its availability for pairing with a pointing device in the line-of-sight proximity of display 20. This wireless beacon will typically be transmitted omnidirectionally, and in an "open" manner for receipt and action by any device that communicates on the same operative frequency and modulation scheme. In process 63, pointing device 10 receives the wireless beacon signal, and in response transmits a wireless pairing request signal. It is contemplated that this wireless pairing request signal is transmitted by pointing device 10 upon user input, for example by the user pressing actuator 15 upon seeing an LED or other indicator on pointing device 10 that is illuminated in response to receipt of the wireless beacon signal. Alternatively, display system 30 may display a human-readable "pairing availability" image at display 20 in combination with the wireless beacon signal, in response to which the user would press actuator 15 to issue the wireless pairing request signal. It is desirable that some action other than automatic response to the wireless beacon occur at pointing device 10 prior to its issuance of the wireless pairing request signal, as otherwise any pointing device within wireless signal range of display system 30, whether or not in view of display 20, would be requesting a visual pairing code, resulting in undue burden on the graphics circuitry in display system 30 generating visual pairing codes, and in clutter of display 20 with those code images.

Upon receipt of the wireless pairing request signal, display system 30 then presents the visual pairing code at display 20, in process 50b, as described above. The pairing procedure then continues as described above relative to FIGS. 4a and 4b, with pointing device 10 capturing images including the pairing code (process 51b) and transmitting a wireless signal including that pairing code (process 53) for matching (decision 54) with the displayed pairing code. For purposes of authorization process 56, identification of pointing device 10 may be communicated either in the wireless pairing request signal transmitted in process 63, or in the wireless signal transmitting the pairing code in process 53, or both. Interactive operation of display system 30 based on commands issued by pointing device 10 then commences and continues, in process 60, as described above.

Figure 4D:
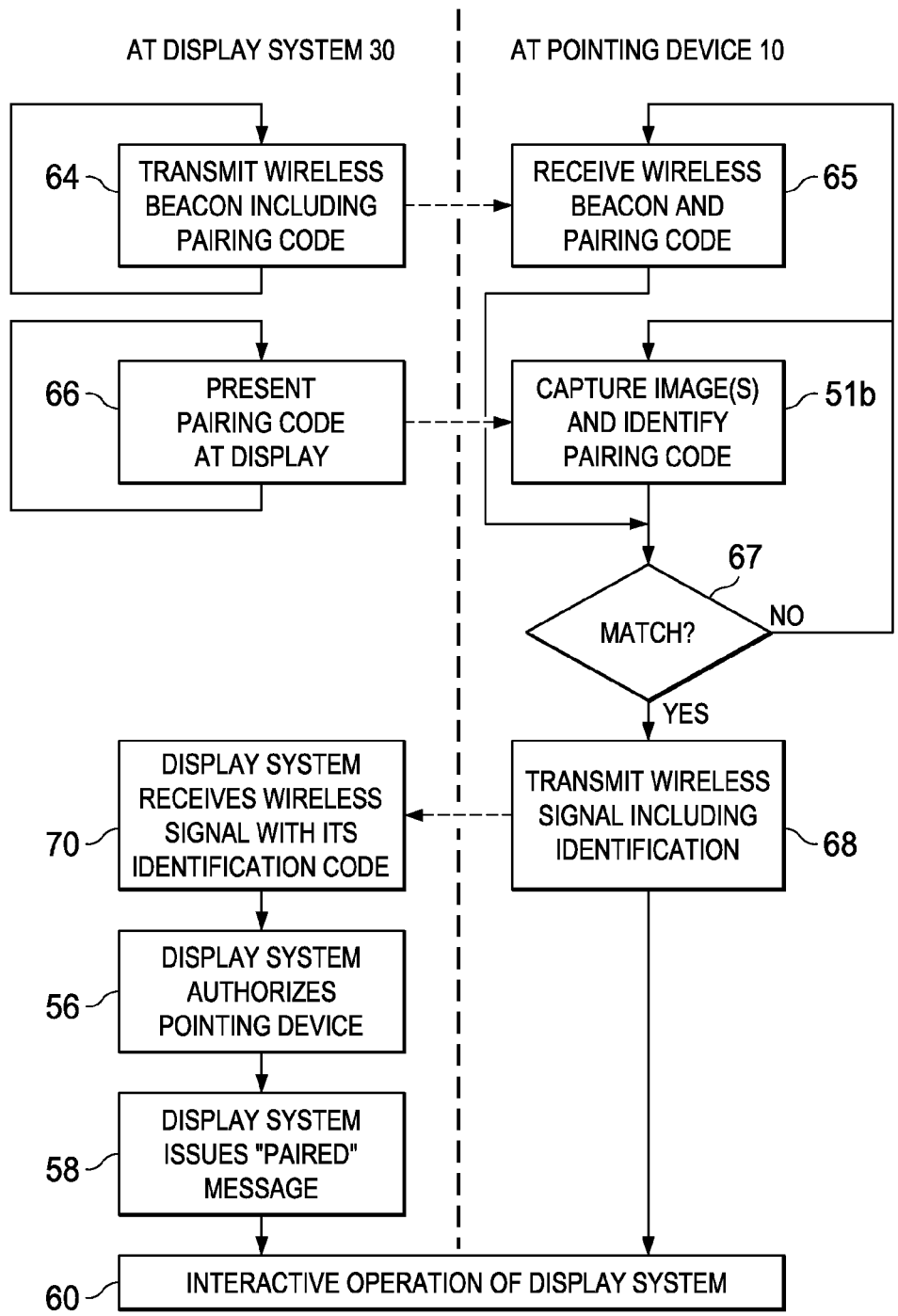

FIG. 4d illustrates another alternative embodiment of the invention, in which pairing circuitry 13 in pointing device 10 makes the pairing decision based on a comparison of pairing code information received both wirelessly and visually. In this embodiment of the invention, pointing device 10 includes wireless receiver functionality (e.g., by way of a wireless transceiver replacing transmitter 18 in the examples of FIGS. 2a and 2b described above) for receiving wireless signals and demodulating those signals into data suitable for decoding and other processing by pairing circuitry 13. In process 64, display system 30 transmits a wireless beacon signal that includes a pairing code. Simultaneously or closely in time with that wireless beacon signal, display system 30 presents a visual pairing code at display 20, in process 66. The pairing codes transmitted and presented in processes 64, 66 match one another, either identically or in some manner that pairing circuitry 13 in pointing device 10 can deduce as matched. In this embodiment of the invention, pairing code transmission processes 64, 66 are repeated periodically or constantly, depending on the desired implementation.

In process 65, the transceiver in pointing device 10 receives and demodulates the wireless beacon signal from display system 30, and the pairing code information in that beacon is decoded by pairing circuitry 13. In process 51*b*, as before, the camera function of pointing device 10 captures images from display 20, from which pairing circuitry 13 identifies the pairing code contained in those images. Pairing circuitry 13 then executes decision 67 to compare the pairing code information decoded from the received wireless beacon signal with that decoded from the captured images from display 20, and determine whether those pairing codes match. If not (decision 67 is "no"), pointing device 10 repeats receiving and capturing processes 65, 51*b*. If the decoded wireless and visual pairing codes match (decision 67 is "yes"), pointing device 10 issues a wireless signal to display system 30 in process 68. That wireless signal indicates that pointing device 10 has received and detected matching pairing codes in both the wireless and visual forms, and is in effect requesting authorization to then issue control signals to display system 30 for control of a presentation at display 20. Pointing device 10 explicitly or implicitly identifies itself in the wireless signal transmitted in process 68, as described above. In process 70, display system 30 receives the wireless signal from pointing device 10, and authorizes pointing device 10 as a source of control signals in process 56. In process 58, display system 30 issues a message (either wirelessly or visually, in this embodiment of the invention), in process 58. Interactive operation of the subject matter at display 20 then commences, as controlled in the GUI sense by the user of pointing device 10.

According to this embodiment of the invention, the combination of the wireless and visual pairing codes issued by display system 30, and received and compared by pointing device 10, ensures that only those pointing devices within sight of display 20 (i.e., in the same room) are authorized to control display system 30. Those pointing devices in other rooms (and which are thus not able to view display 20, but which may be within wireless range of display system 30) will not receive matching wireless and visual pairing codes, and thus will not be authorized by display system 30.

Figure 4E:
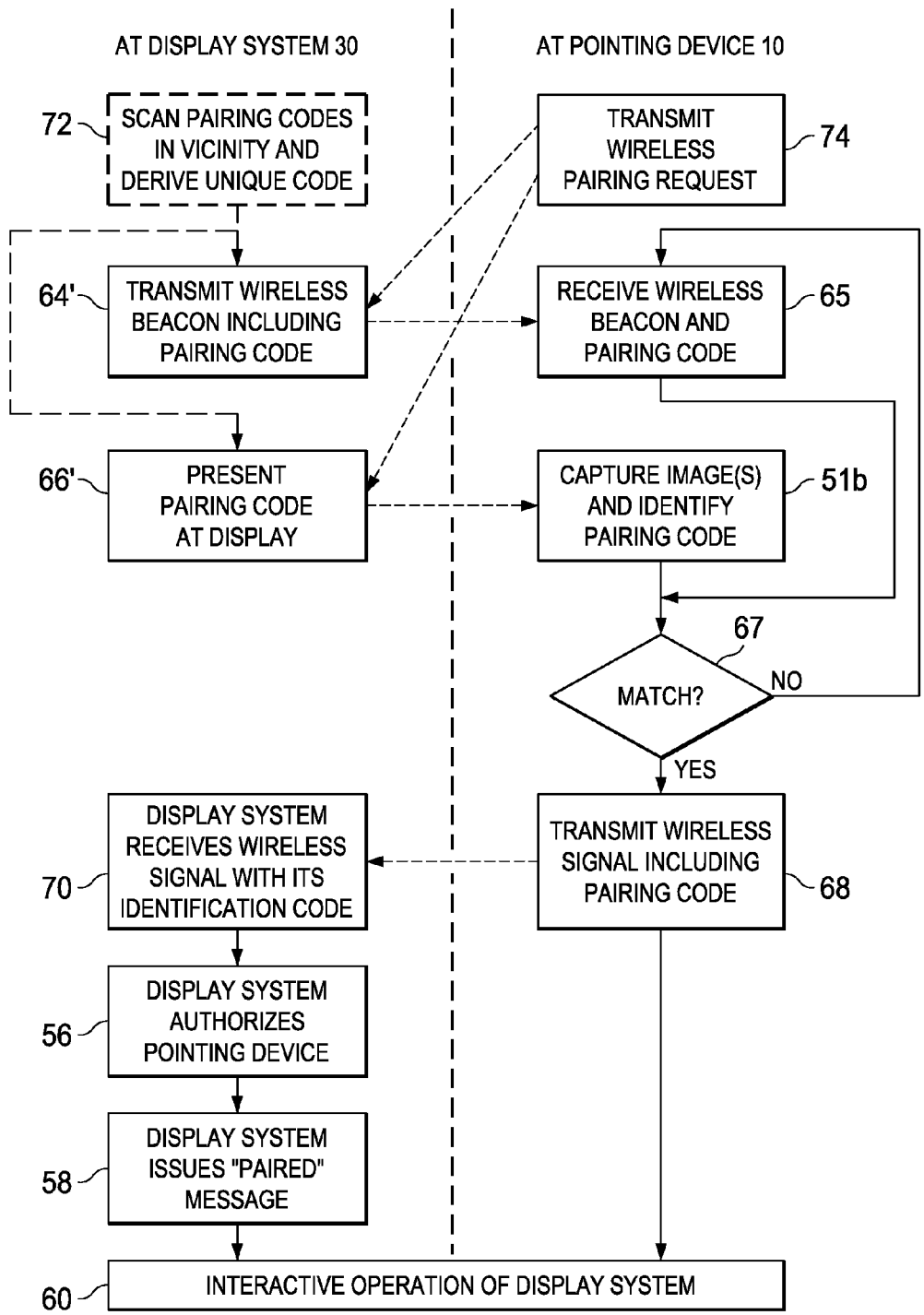

FIG. 4*e* illustrates an alternative approach to the procedure of FIG. 4*d*. According to this embodiment of the invention, pointing device 10 initiates the pairing process by transmitting a wireless signal requesting pairing, in process 74. This wireless pairing request signal may be issued by pointing device 10 in response to a user pressing actuator 15, in response to inertial sensors within pointing device 10 detecting that it has recently been picked up or otherwise moved by a user, in response to images at display 20 detected by pointing device 10, or in response to some other stimulus. According to this embodiment of the invention, display system 30 transmits a wireless beacon including a pairing code in process 64' in response to receiving the pairing request from pointing device 10. Similarly, display system 30 presents the visual pairing code at display 20 in process 66', also in response to receiving the pairing request from pointing device 10. The pairing procedure begins with the receiving of the wireless beacon containing the pairing code and the capturing of images including the visual pairing code by pointing device 10 in processes 65, 51*b*, respectively, and then continuing in the manner described above in connection with FIG. 4*d*. In this embodiment of the invention, however, it is contemplated that the transmission of the wireless beacon and pairing code in process 64' and the presentation of the visual pairing code in process 66' need not be repeated by display system 30 in a continuous or periodic manner, as mentioned above in connection with FIG. 4*d*; rather, processes 64', 66' need only be performed again in response to another wireless pairing request, for example as issued by another pointing device 10 in the same room. Of course, as mentioned above, pointing devices in other rooms may be in wireless range of display system 30. While display system 30 would issue wireless and visual pairing codes in response to requests from those pointing devices, those pointing devices would not receive a matching visual pairing code to received wireless pairing codes from display system 30, and as such would not be authorized to control the presentation by display 30.

FIG. 4*e* also illustrates an optional process that provides additional security (in the sense of avoiding confusion) for installations in which several interactive display systems are within wireless signal range of one another, such as in a conference center or school setting. In such a multiple display system environment, it is of course important that no two display systems issue the same visual pairing code. In any of the embodiments of the invention described herein, neighboring display systems issuing the same pairing code could result in display system 30 authorizing a pointing device 10 in a different room; confusion in the control of a presentation would then result.

Optional process 72 is provided, for example in the procedure shown in FIG. 7*e*, to avoid this problem by determining the pairing code to be issued by display system 30. According to this embodiment of the invention, display system 30 scans wireless signals for beacons issued by all display systems that are within wireless range, and determines the pairing codes contained within those wireless beacon signals, in process 72. Also in process 72, display system 30 derives a pairing code that is unique from those in recently received wireless beacons from other display systems 30 in the vicinity; that derived unique pairing code is then issued in the wireless beacon transmitted in process 64' and in the visual pairing code presented in process 66'. Confusion in the control of a presentation at one display system by a pointing device in a nearby but separate room is thus avoided.

It is contemplated that optional process 72 may also be incorporated into the procedure described above in connection with FIG. 4*d*, and in any of the embodiments of the invention in which pairing codes for systems in other nearby rooms can be obtained (from either display systems or from pointing devices in those rooms) by display system 30.

According to any of these embodiments and their alternatives, it is contemplated that various options and alternatives for periodically refreshing or terminating, as the case may be, the paired relationship between pointing device 10 and display system 30 may be implemented. For example, display system 30 may initiate the pairing procedure periodically, with new pairing codes, to ensure that a previously-paired pointing device 10 that is no longer turned on or in the vicinity does not remain paired. In addition, this periodic refreshing of the pairing procedure can also enable another pointing device to also become paired, such that two or more presenters (e.g., a presenter and a collaborator) can be paired simultaneously.

Further in the alternative, display system 30 may again initiate the pairing procedure in response to not receiving a wireless signal from paired pointing device 10 over a specified time period. It is contemplated that those skilled in the art having reference to this specification will readily recognize such additional refreshing and maintenance procedures for the pairing of pointing devices with display systems in an interactive display system.

Embodiments of this invention provide important benefits and advantages in the operation of an interactive display system. The pairing of a remote pointing device with a display system is greatly facilitated by these embodiments of the invention, in such a way that the computational complexity, and thus the manufacturing cost, of the pointing device can be minimized. In addition, this pairing is accomplished in such a manner as to minimize the user intervention in the pairing process, and the extent to which input capability at the pointing device is required in order to achieve this pairing. The resulting pairing procedure remain sufficiently secure that interference from nearby interactive display systems is minimized, as only those pointing devices within sight of the operative display are capable of pairing, while not requiring two-way pairing (i.e., authentication of the display system with the pointing device). Furthermore, because the information communicated from the pointing device in operation includes little informational content, encryption and other high-overhead pairing operations are not necessary.

It is further contemplated that the visual pairing according to embodiments of this invention can be extended to other applications, such as wired communications links in which the "out-of-band" pairing code communication for link authentication is carried out in the visual domain. These and other applications of embodiments of the invention will be apparent to those skilled in the art having reference to this specification.

While this invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of pairing a remote pointing device with a display system for interactively controlling the operation of the display system, comprising the steps of:
    displaying pairing code information at a graphics display;
    capturing, at the pointing device, image data representative of at least a portion of the graphics display, the captured image data including the pairing code information;
    transmitting, from the pointing device, a wireless pairing signal corresponding to the captured pairing code information;
    receiving the wireless pairing signal at the display system;
    responsive to the received wireless pairing signal matching the pairing code information displayed at the graphics display, authorizing wireless control signals transmitted by the pointing device to control the operation of the display system; and
    then, responsive to wireless control signals from the pointing device, operating the display system to display visual information at the graphics display.

2. The method of claim 1, further comprising:
    transmitting a wireless pairing request signal from the pointing device;
    wherein the displaying step is performed by the display system responsive to receiving the wireless pairing request signal.

3. The method of claim 1, further comprising:
    prior to the step of displaying pairing code information, transmitting a wireless beacon signal from the display system;
    wherein the capturing step is performed by the pointing device responsive to receiving the wireless beacon signal.

4. The method of claim 1, further comprising:
    prior to the step of displaying pairing code information, transmitting a wireless beacon signal from the display system; and
    responsive to receiving the wireless beacon signal, transmitting a wireless pairing request signal from the pointing device;
    wherein the displaying step is performed by the display system responsive to receiving the wireless pairing request signal.

5. The method of claim 1, further comprising:
    not later than the step of displaying pairing code information, displaying a coded image indicating intent of the display system to pair with a pointing device.

6. The method of claim 5, further comprising:
    capturing, at the pointing device, image data representative of at least a portion of the graphics display, the captured image data including the coded image indicating intent to pair;
    responsive to capturing the coded image indicating intent by the display system to pair, transmitting a wireless pairing request signal from the pointing device;
    wherein the step of displaying pairing code information is performed by the display system responsive to receiving the wireless pairing request signal.

7. The method of claim 1, wherein the wireless pairing signal further includes an identifier of the pointing device.

8. The method of claim 1, wherein the step of displaying pairing code information comprises:
    generating visual payload image frame data;
    combining, with the visual payload image frame data, at least one pairing code pattern corresponding to complementary intensity variances at one or more selected pixel locations of the visual payload image frame data, applied in successive frames; and
    displaying the combined visual payload image frame data and pairing code pattern on the graphics display.

9. The method of claim 1, further comprising:
    generating visual payload image frame data;
    combining, with the visual payload image frame data, at least one positioning target pattern;
    displaying the combined visual payload image frame data and positioning target pattern on the graphics display;
    at the pointing device, capturing image data representative of at least a portion of the display including the positioning target;
    determining a pointed-to location of the display responsive to the recovered positioning target pattern,
    generating a wireless control signal from the pointing device corresponding to the pointed-to location of the display, responsive to receiving a user input at the pointing device.

10. A method of pairing a remote pointing device with a display system for interactively controlling the operation of the display system, comprising the steps of:
    displaying pairing code information at a graphics display;

transmitting, from the display system, a wireless beacon signal including the pairing code information;
capturing, at the pointing device, image data representative of at least a portion of the graphics display, the captured image data including the pairing code information;
responsive to the pairing code information in the wireless beacon signal received at the pointing device matching the pairing code information included in the captured image data, transmitting a wireless pairing signal from the pointing device;
receiving the wireless pairing signal at the display system;
authorizing wireless control signals transmitted by the pointing device to control the operation of the display system; and
then, responsive to wireless control signals from the pointing device, operating the display system to display visual information at the graphics display.

11. The method of claim 10, wherein the steps of displaying pairing code information and transmitting the wireless beacon signal are performed repeatedly by the display system.

12. The method of claim 10, further comprising:
transmitting, from the pointing device, a wireless pairing request signal;
wherein the steps of displaying pairing code information and transmitting the wireless beacon signal are performed by the display system responsive to receiving the wireless pairing request signal.

13. The method of claim 10, further comprising:
receiving, at the display system, wireless beacon signals including pairing code information from other display systems;
then, at the display system, deriving a pairing code that differs from the pairing code information received from the other display systems;
wherein the step of transmitting the wireless beacon signal includes pairing code information corresponding to the derived pairing code.

14. The method of claim 10, wherein the wireless pairing signal further includes an identifier of the pointing device.

15. The method of claim 10, wherein the step of displaying pairing code information comprises:
generating visual payload image frame data;
combining, with the visual payload image frame data, at least one pairing code pattern corresponding to complementary intensity variances at one or more selected pixel locations of the visual payload image frame data, applied in successive frames; and
displaying the combined visual payload image frame data and pairing code pattern on the graphics display.

16. The method of claim 10, further comprising:
generating visual payload image frame data;
combining, with the visual payload image frame data, at least one positioning target pattern;
displaying the combined visual payload image frame data and positioning target pattern on the graphics display;
at the pointing device, capturing image data representative of at least a portion of the display including the positioning target;
determining a pointed-to location of the display responsive to the recovered positioning target pattern,
generating a wireless control signal from the pointing device corresponding to the pointed-to location of the display, responsive to receiving a user input at the pointing device.

17. An interactive display system, comprising:
a computerized display system, comprising:
a display;
a computer for generating image data to be displayed on the display, the image data including visual payload data and a pairing code; and
a receiver, for receiving wireless signals; and
a pointing device, comprising:
a housing;
a camera disposed in the housing;
image capture circuitry for capturing image data obtained by the camera;
pairing circuitry, coupled to the image capture circuitry for detecting pairing code information detected in the captured image data; and
a transmitter, coupled to the pairing circuitry, for transmitting wireless signals including pairing code information detected in the captured image data;
wherein the computer is programmed to respond to control signals transmitted by the pointing device responsive to receiving wireless signals from the pointing device including pairing code information matching the pairing code in the displayed image data.

18. The system of claim 17, wherein the transmitter of the pointing device is also for transmitting a wireless pairing request signal;
and wherein the computer is programmed to generate image data including the visual pairing code responsive to receiving the wireless pairing request signal.

19. The system of claim 18, wherein the computer is also for generating image data including a coded image indicating intent of the display system to pair with a pointing device,
and wherein the transmitter of the pointing device transmits the wireless pairing request signal responsive to the pairing circuitry detecting the coded image indicating intent to pair in the captured image data.

20. The system of claim 17, wherein the display system further comprises:
a transmitter for transmitting a wireless beacon signal;
wherein the pointing device further comprises:
a receiver for receiving wireless signals;
and wherein the transmitter of the pointing device transmits the wireless pairing request signal responsive to the receiver of the pointing device receiving the wireless beacon signal.

21. The system of claim 17, wherein the transmitter is also for transmitting an identifier of the pointing device in the transmitted wireless signal including pairing code information.

22. The system of claim 17, wherein the computer generates the pairing code in the form of a non-human-readable pattern.

23. The system of claim 22, wherein the computer generates the pairing code in the form of patterned modulation of light intensity of alternating polarity in alternating frames;
and wherein the pairing circuitry is for subtracting successive frames of captured image data to detect the pairing code.

24. The system of claim 17, wherein the computerized display system further comprises:
target generating circuitry for generating at least one positioning target pattern, the at least one positioning target pattern corresponding to complementary intensity variances to be applied to a portion of the payload image data in successive frames; and
graphics output circuitry for combining the visual payload data with the at least one positioning target pattern into graphics output signals in a format suitable for display;

and further comprising:
positioning circuitry for subtracting successive frames captured by the pointing device from a display coupled to the computer to recover image data including the target pattern, and for determining a location of the display at which the pointing device is aimed.

25. An interactive display system, comprising:
a computerized display system, comprising:
   a display;
   a computer for generating image data to be displayed on the display, the image data including visual payload data and pairing code information; and
   wireless circuitry for transmitting and receiving wireless signals, at least some of the transmitted wireless signals including pairing code information; and
a pointing device, comprising:
   a housing;
   a camera disposed in the housing;
   image capture circuitry for capturing image data obtained by the camera;
   wireless circuitry for receiving and transmitting wireless signals;
   pairing circuitry for comparing pairing code information detected in the captured image data with pairing code information detected in wireless signals received by the wireless circuitry of the pointing device; and
   wherein the computer is programmed to respond to control signals transmitted by the pointing device, responsive to receiving a wireless signal from the pointing device indicating that the pairing circuitry has detected a match between the pairing code information in the displayed image data and pairing code information transmitted by the wireless circuitry of the display system.

26. The system of claim 25, wherein the wireless circuitry of the display system receives wireless signals including pairing codes transmitted by other interactive display systems;
   wherein the computer is programmed to derive a pairing code that differs from the pairing codes in the wireless signals transmitted by other interactive display systems.

* * * * *